US011010951B1

(12) United States Patent
Schwartz et al.

(10) Patent No.: US 11,010,951 B1
(45) Date of Patent: May 18, 2021

(54) EXPLICIT EYE MODEL FOR AVATAR

(71) Applicant: Facebook Technologies, LLC, Menlo Park, CA (US)

(72) Inventors: Gabriel Bailowitz Schwartz, Pittsburgh, PA (US); Jason Saragih, Pittsburgh, PA (US); Tomas Simon Kreuz, Pittsburgh, PA (US); Shih-En Wei, Pittsburgh, PA (US); Stephen Anthony Lombardi, Pittsburgh, PA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/739,040

(22) Filed: Jan. 9, 2020

(51) Int. Cl.
*G06T 13/40* (2011.01)
*G06F 3/01* (2006.01)
*G06T 17/20* (2006.01)
*G06N 20/00* (2019.01)

(52) U.S. Cl.
CPC .............. *G06T 13/40* (2013.01); *G06F 3/013* (2013.01); *G06N 20/00* (2019.01); *G06T 17/20* (2013.01)

(58) Field of Classification Search
CPC ......... G06T 13/40; G06T 17/20; G06F 3/013; G06N 20/00
See application file for complete search history.

(56) References Cited

U.S. PATENT DOCUMENTS

| 7,006,102 B2* | 2/2006 | Rowe | G06T 13/40 345/582 |
| 10,846,919 B2* | 11/2020 | Wang | G06T 13/40 |
| 2004/0263510 A1* | 12/2004 | Marschner | G06T 15/04 345/419 |
| 2011/0115798 A1* | 5/2011 | Nayar | G06T 13/40 345/473 |
| 2017/0213385 A1* | 7/2017 | Yu | G06T 17/20 |
| 2018/0012401 A1* | 1/2018 | Berard | G06T 19/20 |
| 2019/0066384 A1* | 2/2019 | Winston | G06T 19/006 |
| 2019/0213772 A1* | 7/2019 | Lombardi | G06T 15/205 |
| 2020/0043145 A1* | 2/2020 | Cao | G06T 7/40 |

OTHER PUBLICATIONS

Schwartz, et al., the Eyes Have It: An Integrated Eye and Face Model for Photorealistic Facial Animation, ACM Trans. Graph., vol. 38, No. 6, Article 91, 15 pages. Nov. 2019.
(Continued)

*Primary Examiner* — Maurice L. McDowell, Jr.
(74) *Attorney, Agent, or Firm* — Baker Botts L.L.P.

(57) ABSTRACT

In one embodiment, a system may capture one or more images of a user using one or more cameras, the one or more images depicting at least an eye and a face of the user. The system may determine a direction of a gaze of the user based on the eye depicted in the one or more images. The system may generate a facial mesh based on depth measurements of one or more features of the face depicted in the one or more images. The system may generate an eyeball texture for an eyeball mesh by processing the direction of the gaze and the facial mesh using a machine-learning model. The system may render an avatar of the user based on the eyeball mesh, the eyeball texture, the facial mesh, and a facial texture.

20 Claims, 11 Drawing Sheets
(8 of 11 Drawing Sheet(s) Filed in Color)

(56) References Cited

OTHER PUBLICATIONS

Alexander., et al., The Digital Emily Project: Photoreal Facial Modeling and Animation, in ACM Siggraph 2009 Courses (Siggraph '09). Association for Computing Machinery, New York, NY, USA, Article 12, 15 pages. https://doi.org/10.1145/1667239.1667251 2009.

Belghazi., et al., Mutual Information Neural Estimation, in Proceedings of the 35th International Conference on Machine Learning, Stockholm, Sweden, PMLR 80, 10 pages. 2018.

Berard., et al., Lightweight Eye Capture Using a Parametric Model. ACM Trans. Graph. 35, 4, Article 117, 12 pages. https://doLorg/10.1145/2897824.2925962 Jul. 2016.

Berard, et al., High-Quality Capture of Eyes, Disney, research Zurich, 12 pages. 2014.

Cao, et al., Real-Time Facial Animation with Image-Based Dynamic Avatars, ACM Trans. Graph. 35, 4, Article 126 (July 2016), 12 pages. https://doi.org/10.1145/2897824.2925873 Jul. 2016.

Milton Chen, Leveraging the Asymmetric Sensitivity of Eye Contact for Videoconferencing, CHI 2002, Apr. 20-25, 2002, Minneapolis, Minnesota, USA, 8 pages. 2002.

Chen, et al., InfoGAN: Interpretable Representation Learning by Information Maximizing Generative Adversarial Nets, in Proceedings of the 30th International Conference on Neural Information Processing Systems, Barcelona, Spain, 9 Pages. 2016.

Marvin G. Cline, The Perception of Where a Person Is Looking, The American Journal of Psychology 80, 1 (1967), 41-50. 1967.

Cootes, et al., Active Appearance Models, University of Manchester, 484-498. 1998.

L F. Dell'Osso, Evidence Suggesting Individual Ocular Motor Control of Each Eye (muscle), Journal of Vestibular Research, vol. 4, No. 5, pp. 335-345. 1994.

M. Fetter, Vestibulo-ocular Reflex, Neuro-Ophthalmology. 40 (Feb. 2007), 35-51. https://doi.org/10.1159/000100348 Feb. 2007.

Fischer, et al., RT-Gene: Real-Time Eye Gaze Estimation in Natural Environments, in JEFF European Conference on Computer Vision (ECCV), 19 pages. 2018.

Francois, et al., Image- Based Modeling of the Human Eye, IFEE Transactions on Visualization and Computer Graphics 15, 5, 815-827. https://doi.org/10.1109/Tvcg.2009.24 2009.

Gibson., et al., Perception of Another Person's Looking Behavior, The American Journal of Psychology, vol. 76, No. 3, 386-394. 1963.

Girshick, Fast R-CNN, In Proceedings of the International Conference on Computer Vision (ICCV), 9 pages. 2015.

Higgins, et al., Beta-Vae: Learning Basic Visual Concepts with a Constrained Variational Framework, In International Conference on Learning Representations (ICLR), 22 pages. 2017.

Karras, et al., A Style-Based Generator Architecture for Generative Adversarial Networks, IFEE, 10 pages. 2019.

Kato, et al., Neural 3D Mesh Renderer, In the IFEE Conference on Computer Vision and Pattern Recognition (CVPR), 10 pages. 2018.

Kingma, et al., Auto-Encoding Variational Bayes, in International Conference on Learning Representations (ICLR). 2013.

Kononenko, et al., Photorealistic Monocular Gaze Redirection Using Machine Learning, Skolkovo Institute of Science and Technology, 15 pages. 2017.

Lample, et al., Fader Networks: Manipulating Images by Sliding Attributes, 31st Conference on Neural Information Processing Systems (NIPS 2017), Long Beach, CA, US, 10 pages. 2017.

Li, et al., Rethinking on Multi-Stage Networks for Human Pose Estimation, arXiv preprint arXiv:1901.00148v4, 10 pages. May 30, 2019.

Liu, et al., Soft Rasterizer: A Differentiable Renderer for Image-based 3D Reasoning, CVF, 10 pages. 2019.

Lombardi, et al., Deep Appearance Models for Face Rendering, ACM Trans. Graph. vol. 37, No. 4, Article 68, 13 pages. https://doi.org/10.1145/3197517.3201401 Aug. 2018.

Loper, et al., OpenDR: An Approximate Differentiable Renderer, In IEEE European Conference on Computer Vision (ECCV), 16 pages. 2014.

Olszewski, et al., High-Fidelity Facial and Speech Animation for VR HMDs, ACM Trans. Graph., 14 pages. 2016.

Park, et al., Few-Shot Adaptive Gaze Estimation, In IEEE International Conference on Computer Vision (ICCV), 10 pages. 2019.

Tom Porter, Creating lifelike characters in Toy Story, ACM Sigart Bulletin 8, pp. 10-14. Dec. 1997.

Radford, et al., Unsupervised Representation Learning with Deep Convolutional Generative Adversarial Networks, ICLR, 16 pages. Jan. 7, 2016.

Ranjan, et al., Light-weight Head Pose Invariant Gaze Tracking, In JEFF Computer Vision and Pattern Recognition Workshop (CVPRW), 9 pages. 2018.

Seymour, et al., Meet Mike: Epic Avatars, In ACM Siggraph 2017 VR Village, Article 12, 2 pages. 2017.

Shu, et al., Deforming Autoencoders: Unsupervised Disentangling of Shape and Appearance, In the European Conference on Computer Vision (ECCV), 16 pages. 2018.

Thies, et al., FaceVR: Real-Time Facial Reenactment and Eye Gaze Control in Virtual Reality, arXiv preprint arXiv:1610.03151v2, 16 pages. Mar. 21, 2018.

Tobii VR, Discover New Possibilities with Eye Tracking in VR,https://vrtobii.com. 8 pages. 2018.

Wei, et al., Convolutional pose machines, In CVPR, 9 pages. 2016.

Wei, et al., VR Facial Animation via Multiview Image Translation. ACM Trans, Graph. 38, 4, Article 67, 16 pages. Jul. 2019.

Wen, et al., Real-Time 3D Eye Performance Reconstruction for RGBD Cameras, IEEE Transactions on Visualization and Computer Graphics 23, 12, pp. 2586-2598. 2017.

Wolf, et al., An eye for an eye: A single camera gaze replacement method, 8 pages. 2010.

Wood, et al., A 3D Morphable Eye Region Model for Gaze Estimation, 17 pages. 2016.

* cited by examiner

EXPLICIT EYE MODEL FOR AVATAR

TECHNICAL FIELD

This disclosure generally relates to avatar rendering, and more specifically method, apparatus, and system for rendering an avatar with an individual model for eyeballs.

BACKGROUND

Current augmented reality (AR)/virtual reality (VR) devices render an avatar for the user during operations. The avatar reproduces a facial expression of the user. The existing approaches render the face of the avatar, which includes the avatar's eyes, by utilizing an entire facial expression of the user. By the current methods, the avatar's eyes, especially the gaze of the avatar, are overly dependent on the rest of the avatar's expression and cannot reproduce the eyeballs of the user. Furthermore, the avatar's facial expression is represented by a 3D mesh with texture, and however, the avatar's eyes are only textures, and consequently a real gaze of the user cannot be reproduced.

SUMMARY OF PARTICULAR EMBODIMENTS

To address the foregoing problems, disclosed are methods, apparatuses, and a system, to render an avatar's eyes with a separated model, such that the rendered avatar can reproduce a real gaze of the user. The present disclosure provides a method to generate the avatar's eye with a 3D mesh and eyeball texture individually to render the avatar for the user. The method disclosed in the present application detects one or more keypoints in the user's eyeballs to generate an eyeball mesh. Furthermore, the method disclosed in the present application utilizes a neural network to output an eyeball texture, which neural network is trained using a facial mesh and a direction of a gaze as input, in which the direction of the gaze is computed based on the determined keypoints and the facial mesh is generated based on depth measurements of the user's facial features.

The embodiments disclosed herein are only examples, and the scope of this disclosure is not limited to them. Particular embodiments may include all, some, or none of the components, elements, features, functions, operations, or steps of the embodiments disclosed herein. According to one embodiment of a method, the method comprises, by a computing system, capturing one or more images of a user using one or more cameras, the one or more images depicting at least an eye and a face of the user. The method further comprises determining a direction of a gaze of the user based on the eye depicted in the one or more images. The method yet further comprises generating a facial mesh based on depth measurements of one or more features of the face depicted in the one or more images. The method further comprises generating an eyeball texture for an eyeball mesh by processing the direction of the gaze and the facial mesh using a machine-learning model. The method yet further comprises rendering an avatar of the user based on the eyeball mesh, the eyeball texture, the facial mesh, and a facial texture.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the present disclosure and their embodiments may provide solutions to these or other challenges. There are, proposed herein, various embodiments which address one or more of the issues disclosed herein. The methods disclosed in the present disclosure may provide a method for rendering an avatar by establishing an individual mesh for user's eyeballs, such that the user's gaze can be reproduced accurately. The methods disclosed in the present disclosure improve the representation of the user's eye contact in virtual reality and simulate the gaze of the user in a much real, flexible way, due to the independence of the eyeball mesh and eyeball texture from the rest part of the avatar.

Particular embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains drawings executed in color. Copies of this patent or patent application publication with color drawing(s) will be provided by the Office upon request and payment of the necessary fee.

The accompanying drawing figures incorporated in and forming a part of this specification illustrate several aspects of the disclosure, and together with the description serve to explain the principles of the disclosure.

DESCRIPTION OF EXAMPLE EMBODIMENTS

Currently, rendering an avatar's eye for a user is heavily based on the entire face expression of the user, and therefore, the gaze of the user and the texture of the eyeballs cannot be correctly reproduced. For simulating a real eye contact for the user in a display, especially a head-mounted display (HMD), an individual eye model is provided to render the eyeballs of the user. Embodiments described herein provides a method using a neural network to generate the avatar's eyeballs which is separated from the rest of the avatar, such that the face of the avatar is constructed based on (1) a facial mesh and a facial texture and (2) an eyeball mesh and an eyeball texture. Therefore, a gaze of the user described in the present disclosure can be reproduced accurately and vividly in the rendered avatar.

Furthermore, the rendered avatar in the embodiments described herein can be compared to the captured image of the user's face to update both face and eye neural networks. Therefore, both of the machine-learning models can be trained concurrently. In addition, the eyeball texture described in the present disclosure may comprise two layers of texture to reproduce the eyeball texture of the user. A base texture comprises an area where does not change as the eye moves, and a surfacial texture comprises refraction and reflection in the eye.

The term "avatar" may, in some examples, refer to a rendered image of a subject, such as a rendered image of a subject that is animated and interactive within the context of a VR/AR presentation. In some examples, a "subject" may comprise a human face. It should be appreciated, however, that the term "subject" as used herein may encompass any portion or entirety of a human or other animal. Also, the term "subject" as used herein may encompass clothing, plants, and other objects.

As discussed above, particular embodiments may use machine learning to generate the desired outputs for the gaze of the user, which is indistinguishable from reality. Provided below is an overview of particular embodiments of a machine-learning architecture and its inputs and training procedures to support rendering for AR/VR displays.

Figure 1:
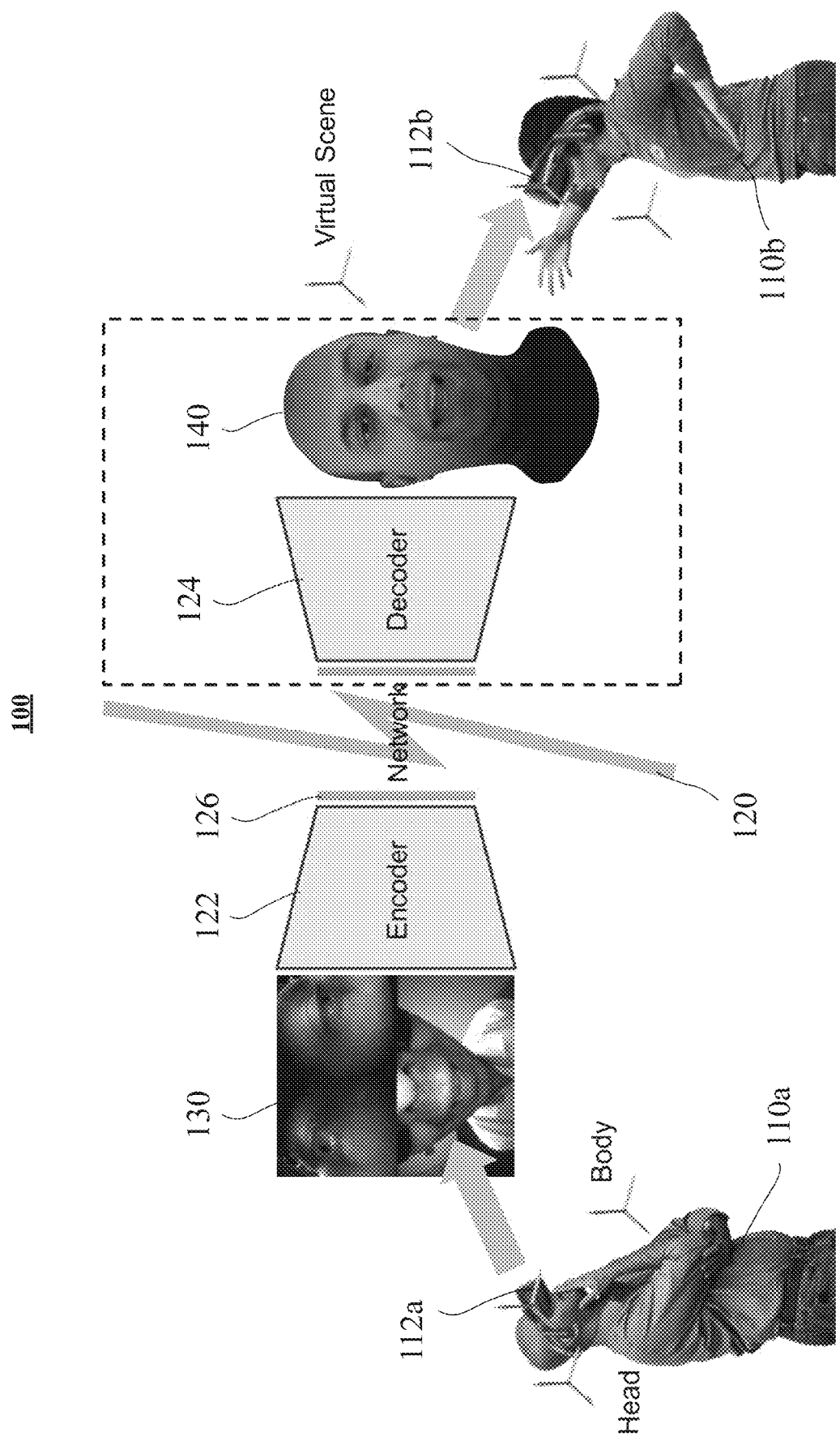
FIG. 1 illustrates an example diagram of an avatar-rendering system architecture.

FIG. 1 illustrates an example diagram of an avatar-rendering system architecture 100, in accordance with certain embodiments. The avatar-rendering system 100 may comprise at least one HMD 112 which utilizes a neural network 120 to render an avatar for users 110 respectively. For example, a HMD 112a captures one or more images 130 of a user 110a using its camera and encodes the one or more images 130 into a code 126 via an encoder 122. The code 126 describes a state of the face of the user 110a. In particular embodiments, the one or more images 130, e.g., inputs, may include geometry information and view-dependent texture information of a subject, e.g., the user 110a. Furthermore, the one or more image 130 of the user 110a may be captured from various viewpoints, such that a texture of the avatar can be compensated based on the images from different viewpoints. The decoder 124 then decodes the code 126, which includes the geometry information and the view-dependent texture information of the subject, to render an avatar 140 for the user 110a, which avatar 140 can be viewed by a user 110b via his/her HMD 112b. In particular embodiments, the decoder 124 decodes the code 126 to produce a stereo image of the user 110a. In particular embodiments, the avatar-rendering process in the avatar-rendering system 100 may be bidirectional. For example, the user 110b may also render an avatar of the user 110b to be displayed in the HMD 112a using his/her HMD 112b.

In particular embodiments, the HMD 112 includes one or more coordinate systems to estimate a global body pose of the user 110 for rendering an avatar. The global body pose comprises a pose of the user's head relative to the user's body, a pose of the HMD 112 relative to the user's head, and a pose of the displayed image relative to the user's eyes.

Embodiments of the machine-learning (ML) model can be trained and applied to various imagery tasks for computational displays by changing the input and output of the network. In particular embodiments, the ML model may be an autoencoder, a generative adversarial network, or any other suitable ML architecture. Embodiments of the ML model may be configured to generate images for wide field of view (FOV) displays, holographic displays, light field displays, and any other suitable displays.

Figure 2A:
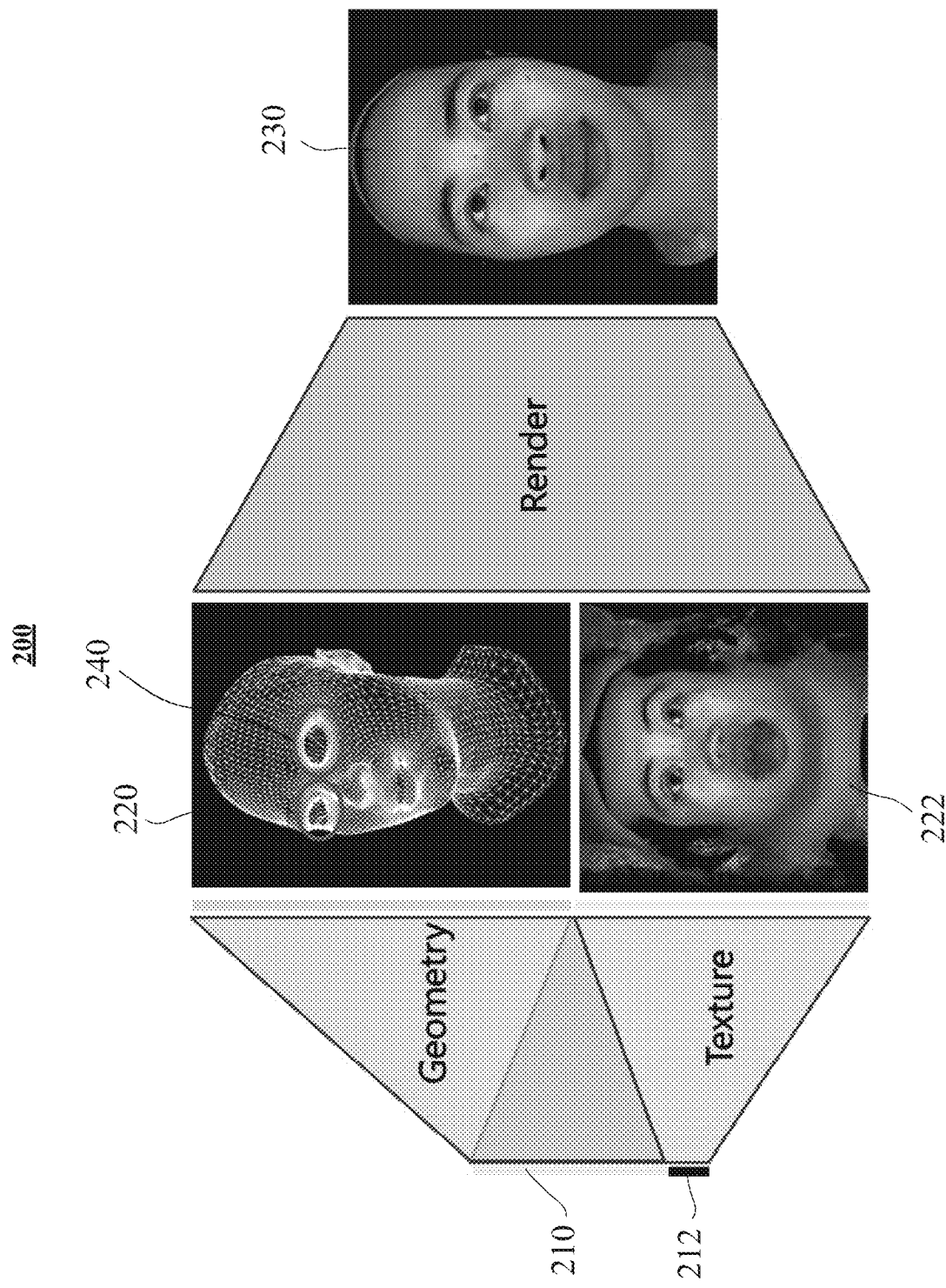
FIGS. 2A-2C illustrate an example diagram of a decoder producing a facial mesh, and a facial texture for an avatar.
Figure 2B:
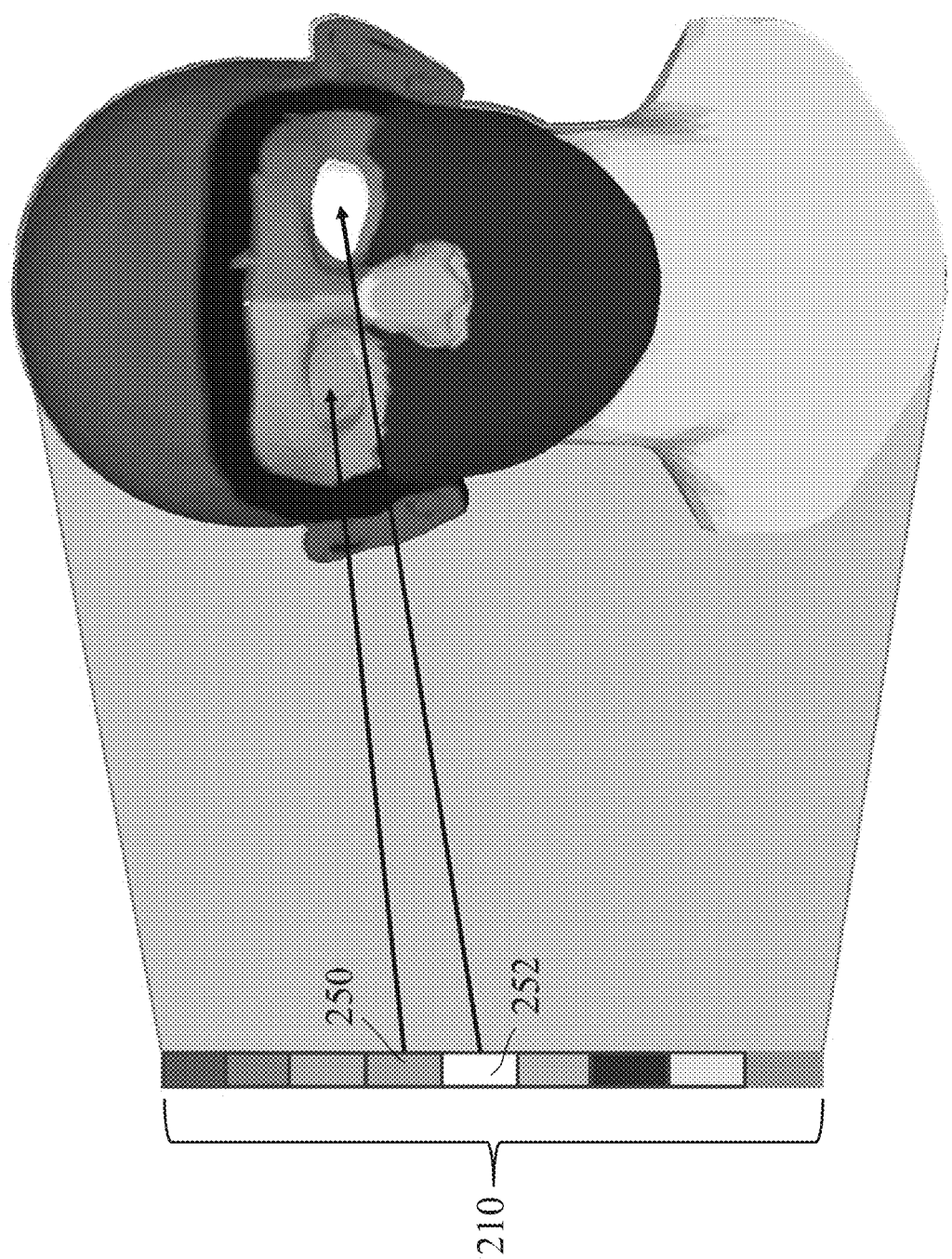
Figure 2C:
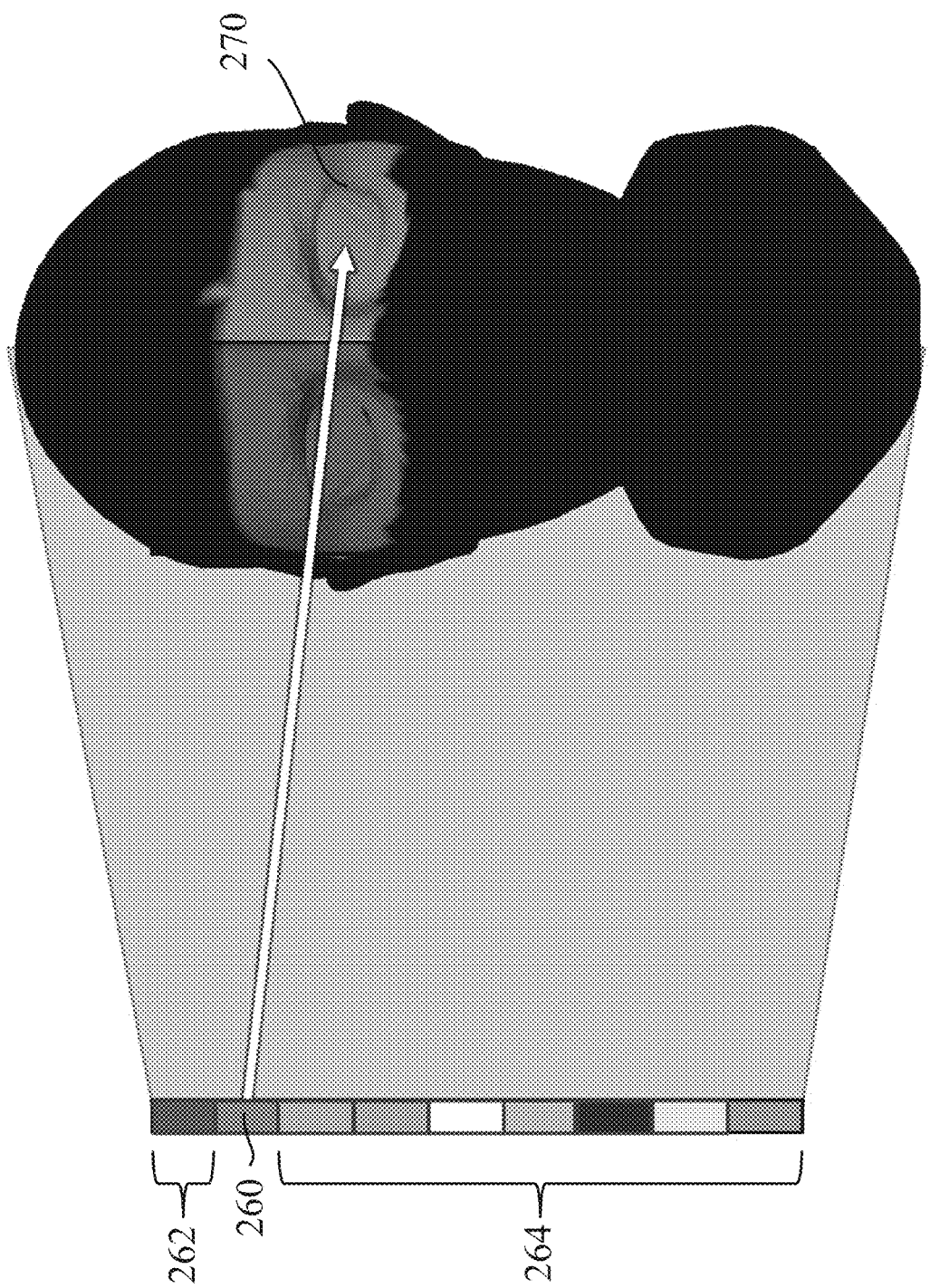

FIGS. 2A-2C illustrate an embodiment of rendering an avatar's face, in accordance with certain embodiments. In FIG. 2A, a decoder 200 decodes a code 210 to produce a geometry 220 of the user's face, e.g., a 3D facial mesh, and to reproduce a texture 222 of the user's face based on a view point 212 via a face model. Based on the geometry 220 and the texture 222 of the user's face, the face model may render a face image 230 of the user, e.g., an avatar/subject. In particular embodiments, the facial mesh may be a coarse mesh representation of the user's facial features, which features may be generated based on depth measurements of the user's face. For example, a template facial mesh may be distorted or modified based on the depth measurements of the user's face, so that the facial mesh may reflect the contours of the user's face. Furthermore, for reconstructing a gaze of the user in the eyes, an eye model builds an eyeball mesh based on a segmented face code around an eye area 240 among the code 210. In FIG. 2B, the code 210 comprises one or more segmented face codes to describe an entire face of the user, and each of the segmented face code describes a specific feature or a specific area of the user's face. For example, a first segmented face code 250 may describe features of the user's right eye, and a second segmented face code 252 may describe features of the user's left eye.

In FIG. 2C, any correlations between the segmented face codes in the code 210 can be exploited for compression. In particular embodiments, correlations which may be exploited for compression can be determined based on the laws of physics. The correlations are structurally related in vergence. For example, the movements of the eyeballs are not necessarily correlated to the movements of eyebrow. The movements of the eyebrows when the user looks up are not necessarily caused by the user's eye motions. On the other hand, the movements of eyelids might be caused by the eye motion, and therefore, the correlations between the eyeballs and the eyebrows can be exploited for compression. In order to output an image for an assigned/specific region, e.g., the left eye of the user, the eye model fixes/preserves a latent segmented face code 260 corresponding to a region 270 on the face, randomly mixes all other segmented face codes 262, 264 in the code 210, and decodes outputs. For example, all the values in the segmented face codes which are not fixed can be scrambled. In particular embodiments, the latent segmented face code may be one or more segmented face codes depending on the region on the face which is expected to render. With the outputs from each iteration, the eye model is trained and only penalizes the reconstruction within the associated region, e.g., the region 270. For example, when one segmented face code is fixed and the rest of the segmented face codes are scrambled, a correct, reproduced region corresponding to the fixed segmented face code would be an expected output, despite the scrambled segmented face codes in the code 210. By scrambling all the segmented face codes but the desired part of the code (e.g., the fixed/preserved code), the decoder cannot rely on any other scrambled parts of the code (e.g., the segmented face codes 262, 264), and generates the associated part of the face based on the preserved/untouched code (e.g., the segmented face 260). In particular embodiments, a texture of the associated part on the face can also be reproduced using a similar model which is trained as disclosed above.

Figure 3A:
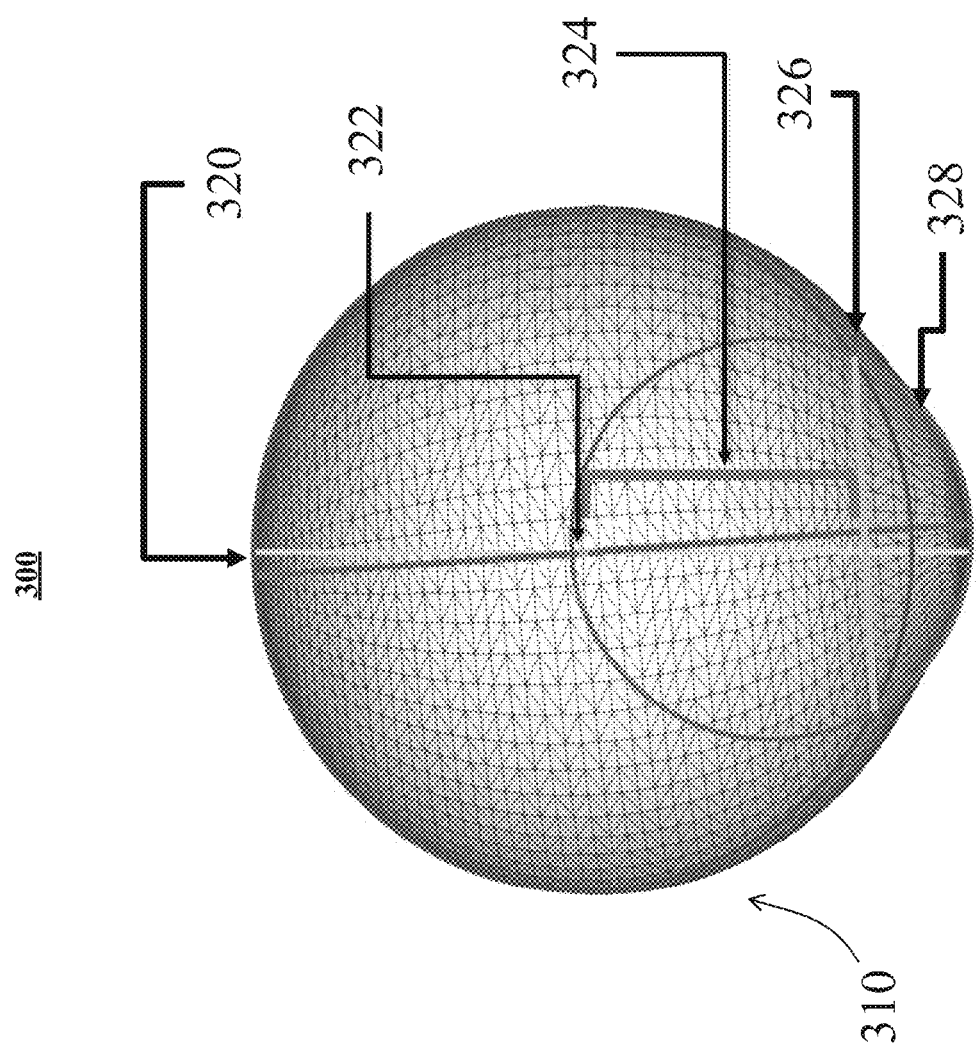
FIGS. 3A-3B illustrate an example embodiment of establishing avatar's eyeball mesh based on detected keypoints in user's eyeball.
Figure 3B:
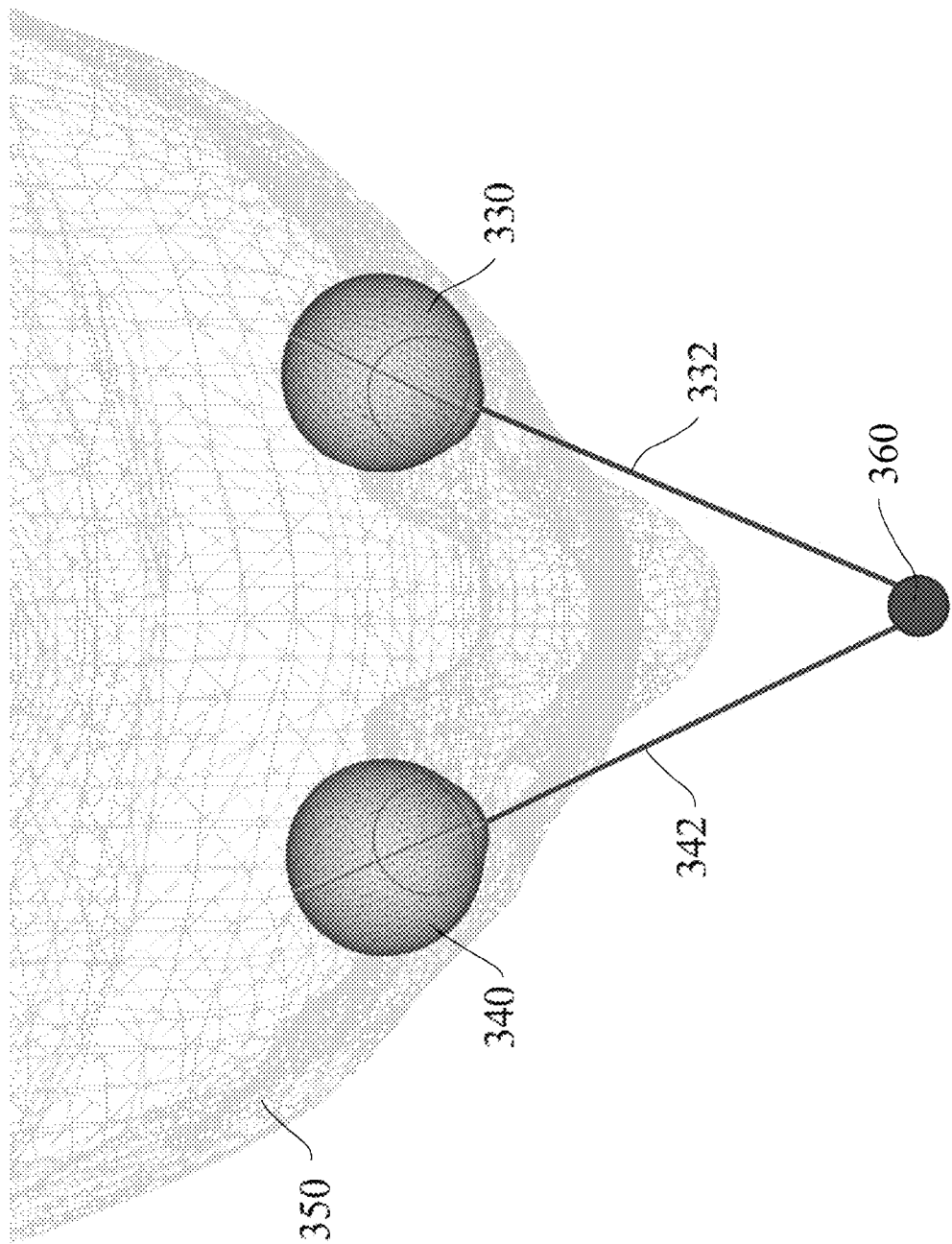

FIGS. 3A-3B illustrate an embodiment of establishing an eyeball mesh based on detected keypoints in the user's eyeball, in accordance with certain embodiments. In FIG. 3A, an eye model 300 is used for fitting and decoder training based on images of the user's face. In particular embodiments, the images of the user's face may be rendered via a region-based extraction from the images of the user's face, e.g., an extraction of a region of/around the user's eyes. In particular embodiments, the images of the user's face may be images of an eye area of the user which are rendered by the method disclosed in FIGS. 2A-2C. A keypoint detection network detects one or more keypoints in the user's eyeballs based on the images of the user's face. The keypoints may be used to determine features of the user's eyeballs, such as the contour of the eyeballs. In particular embodiments, the keypoint detection network may be trained by images of eyeballs to determine keypoints in the eyeballs. The eye model 300 may be distorted or modified based on the determined features in the user's eyeballs to establish an eyeball mesh 310 for the user. In particular embodiments, the eyeball mesh 310 comprises an optical axis 320, a rotation center 322, an iris depth 324, an iris radius 326, a cornea radius 328, and any other features determined in the user's eyeball which facilitates a computation for a gaze of the user. For example, by calculating the shift or the rotated angle of the optical axis 320, a direction of gaze can be determined. In particular embodiments, an initiation for rendering the eye model may be capturing an initial gaze of the user, and the initial gaze can be optimized with offsets to initial estimations of eyeball mesh/eyeball shape.

In FIG. 3B, the decoder determines a first gaze 332 of a left eyeball mesh 330 and a second gaze 342 of a right eyeball mesh 340. Furthermore, the decoder determines an orientation and a position and of the left eyeball mesh 330 and the right eyeball mesh 340 relative to a facial mesh 350 of the user, and embeds the left eyeball mesh 330 and the right eyeball mesh 340 into the facial mesh 350 to determine an eye contact 360 based on the first gaze 332 and the second gaze 342. In particular embodiments, the facial mesh 350 may be established by the method disclosed in FIGS. 2A-2C. In particular embodiments, the left eyeball mesh 330 and the right eyeball mesh 340 may be modified by optimizing eyeball orientations to match the keypoints and adjusting the shape parameters across all frames/images, such that the modified eyeball meshes 330, 340 may be much accurate in eyeball shape and be beneficial to gaze estimation.

Figure 4A:
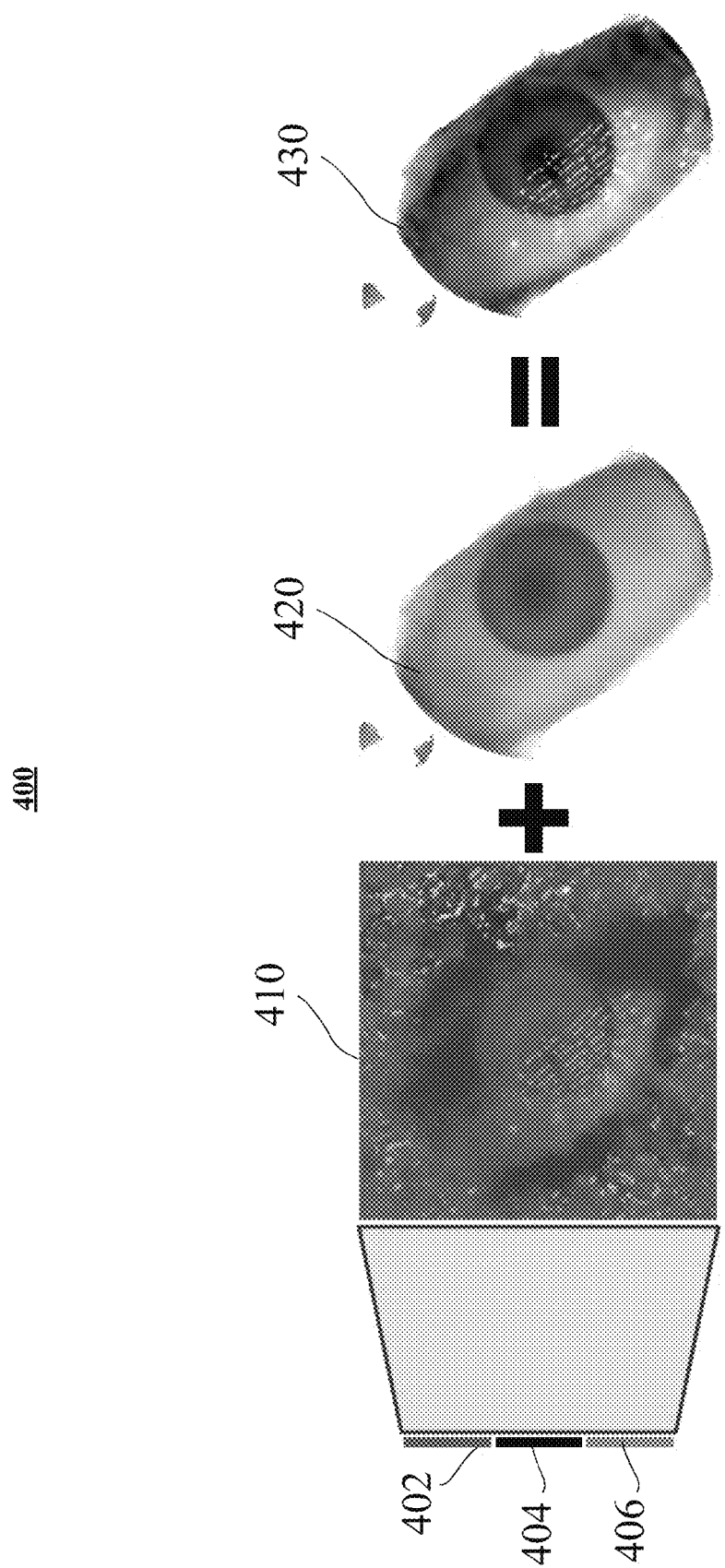
FIGS. 4A-4B illustrate an example diagram of rendering an avatar using an eye model and a face model.
Figure 4B:
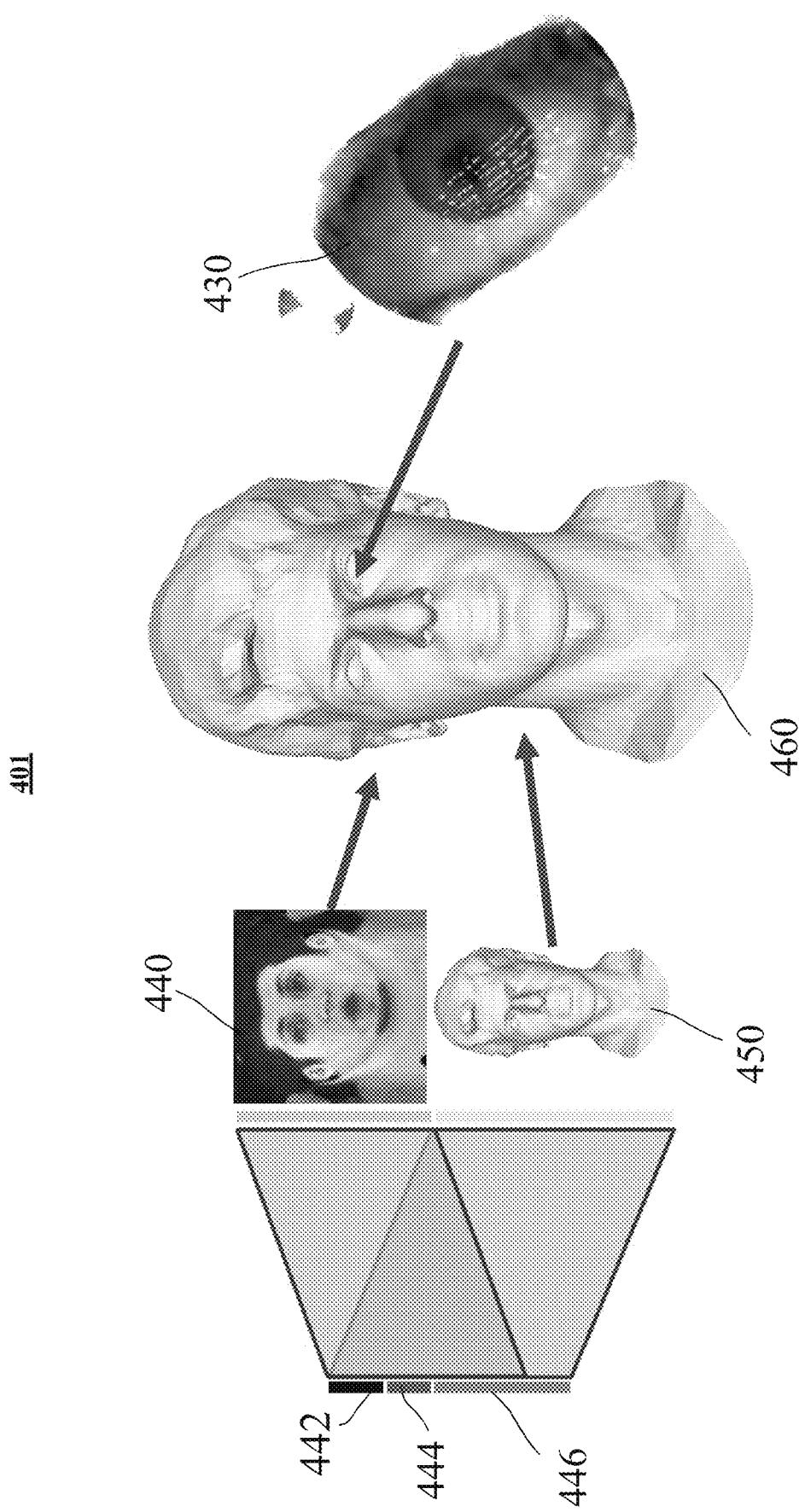

FIGS. 4A-4B illustrate an embodiment of rendering an avatar based on an eye model and a face model, in accordance with certain embodiments. In FIG. 4A, an eyeball decoder 400 establishes an eyeball mesh 410 based on codes describing a gaze 402, a viewpoint 404, and a geometry 406. Furthermore, the eyeball decoder 400 produces an eyeball texture 420 which describes dynamic gaze, e.g., based on the texture of cornea, and expression/appearance in the eye, such as the glints and ambient occlusion, via a trained neural network. The trained neural network utilizes a direction of the user's gaze and a facial mesh and outputs a corresponding eyeball texture. The direction of the user's gaze may be generated by computing the detected keypoints in the user's eyeballs, and the facial mesh may be generated based on depth measurements of the user's face, specific to features of the user's face.

In particular embodiments, the eyeball texture 420 comprises a base texture and a surfacial texture. The base texture comprises an area and/or appearance which does not change as the eye moves, and the surfacial texture comprises refraction and reflection in the eye. The eyeball decoder 400 finalizes the eyeball texture 420 by combining the base texture and the surficial texture, and then embeds the finalized eyeball texture 420 in the eyeball mesh 410 to establish an eye model 430. In particular embodiments, the eyeball decoder 400 may penalize the difference from captured images of the user until the eye model 430 matches the captured images of the user. In particular embodiments, the eyeball decoder 400 may not have ground-truth geometry to unwrap eyeball textures from.

In FIG. 4B, a face decoder 401 produces establishes a facial texture 440 and a facial mesh 450 based on codes describing a gaze 442, a viewpoint 444, and a geometry 446, via a trained neural network. The face decoder 401 renders a face model 460 based on the facial texture 440 and the facial mesh 450. In particular embodiments, the face model may be rendered via the method disclosed in FIGS. 2A-2C.

The established eye model 430 may then be combined with the rendered face model 460 to render an avatar for the user. In particular embodiments, the eye model 430 and the face model 460 may be trained separately to agree with each other. For example, if the eyeball model 430 is looking one direction and the eyelids in the face model 460 correspond to a different direction, the rendered avatar can be gaze-conditional, so that the eyeball model 430 and the face model 460 can be changed to match an expected result, e.g., the gaze of the eye model 430 may be changed to match an expected shape of the eyelid rendered in the face model 460. In particular embodiments, the face decoder 401 may further be refined with additional differentiable rendering optimizations based one the captured images.

In particular embodiments, during each training iteration, the neural network may output an eyeball texture for the eyeball mesh. Likewise, a facial texture may be rendered in a similar manner via a trained neural network. At this point, e.g., after training the eyeball neural network and the face neural network, the following are available to the training system: (1) a facial mesh and a facial texture and (2) an eyeball mesh and an eyeball texture. The training system may then render an image of the avatar's face using all the above data. In particular embodiments, the rendered image can be compared to the captured image of the user's face (i.e., ground truth). The comparison results can be used to update both neural networks (the eyeball and face networks) for generating the eyeball texture and facial texture. In other words, the machine-learning models can be trained concurrently.

Figure 5:
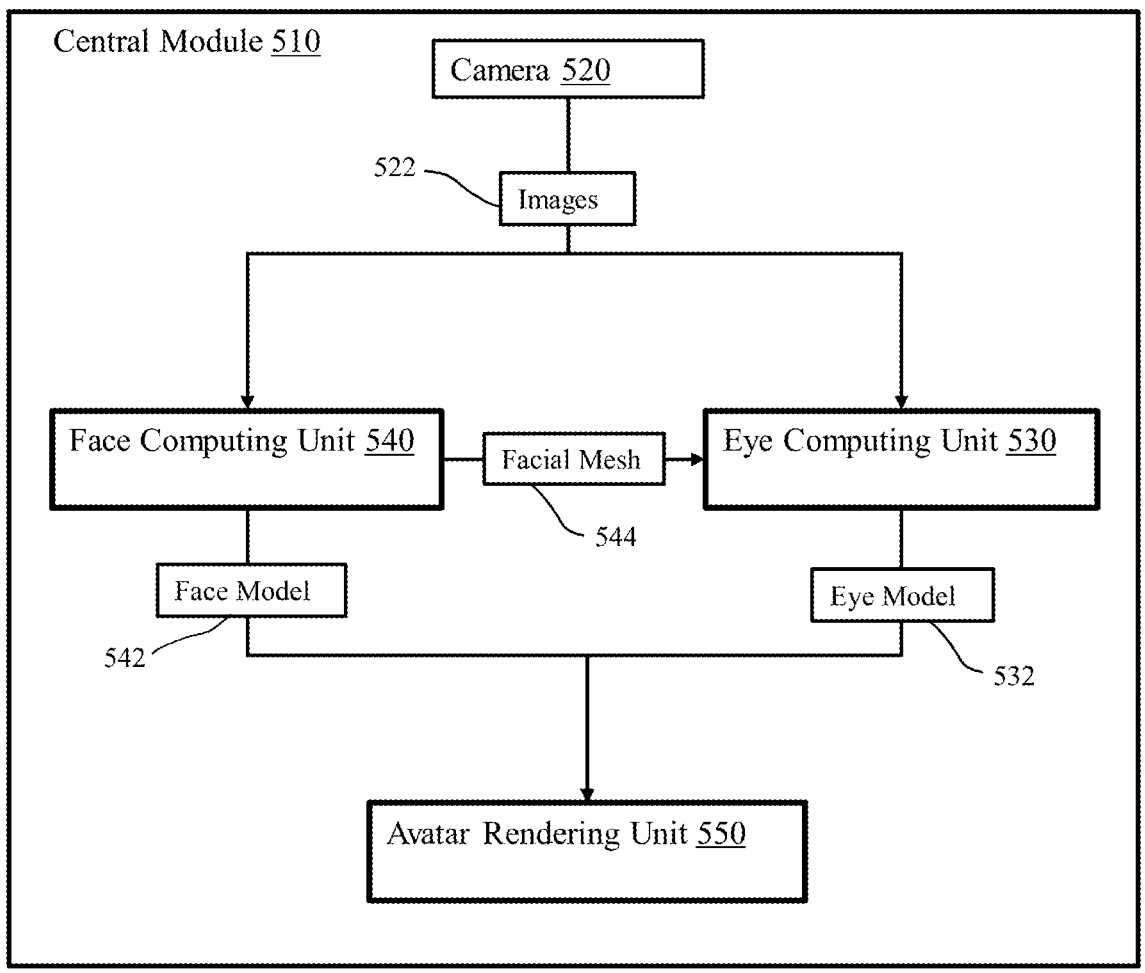
FIG. 5 illustrates an example diagram of a central module for rendering an avatar.

FIG. 5 illustrates an example diagram of an avatar-rendering system 500, in accordance with certain embodiments. The avatar-rendering system 500 comprises at least one central module 510 to render an avatar for the user or to display an avatar of another user. In particular embodiments, the central module 510 may be a headset. The central module 510 comprises a camera 520, an eye computing unit 530, a face computing unit 540, and an avatar rendering unit 550. The camera 520 captures one or more images 522 of the user. The one or more images 522 depict at least an eye and a face of the user. In particular embodiments, an initiation of rendering the avatar for the user may be completed by capturing an image of the user's eyes to determine/define an initial gaze of the user. The camera 520 sends the one or more images 522 of the user to the eye computing unit 530 and the face computing unit 540 respectively.

The face computing unit 540 receives the images 522 of the user from the camera 520. In particular embodiments, the face computing unit 540 comprises an encoder encoding the images 522 and a face decoder decoding codes describing an entire face of the user, including a viewpoint, a gaze and a geometry, via a trained neural network. The face computing unit 540 computes a facial texture and a facial mesh 544 based on the images 522 to render a face model 542. In particular embodiments, the facial mesh 544 may be a mesh of the user's facial features which is generated/modified based on depth measurements of the user's face captured in the images 522. The face computing unit 540 then sends the face model 542 to the avatar rendering unit 550. In particular embodiments, the face computing unit 540 sends the facial mesh 544 to the eye computing unit 530 for producing an eyeball texture.

The eye computing unit 530 receives the images 522 of the user from the camera 520. In particular embodiments, the eye computing unit 530 receives the facial mesh 544 from the face computing unit 540. In particular embodiments, the eye computing unit 530 comprises an encoder encoding the images 522 and an eyeball decoder decoding codes describing a region of eye, via a trained neural network. The eye computing unit 530 extracts a region of the eyes from the images 522 to build an eye model 532. The eye computing unit 530 detects keypoints, which describes features of the user's eyeball, in the user's eyes based on the images of the region of the eyes, and then distorts a default eyeball model based on the detected keypoints to establish an eyeball mesh. The eye computing unit 530 produces an eyeball texture based on the region of the eyes. In particular embodiments, the eyeball texture may be produced via a neural network, which neural network is trained using the direction of the user's gaze and a facial mesh 544 built by the face computing unit 540 as input. In particular embodiments, the direction of the user's gaze can be determined by the method disclosed in FIGS. 3A-3B. The eye computing unit 530 then embeds the eyeball texture in the established eyeball mesh to complete the eye model 532. In particular embodiments, the eyeball mesh may be oriented/adjusted to match the eyeball texture. In another embodiments, the eyeball texture may be adjusted to match the eyeball mesh as well under certain scenarios. The eye computing unit 530 sends the eye model 532 to the avatar rendering unit 550.

The avatar rendering unit 550 receives the face model 542 and the eye model 532 from the face computing unit 540 and the eye computing unit 530 respectively. The avatar rendering unit 550 renders an avatar for the user by combining the eye model 532 with the face model 542. In particular embodiments, the avatar rendering unit 550 may remove the planes which covers the eyeballs in the face model 542 and insert the eye model 532 into the planes. The avatar rendering unit 550 can adjust the eyeball model 532 to match the face model 542. For example, the eyeball model 532 can be independently oriented to match the eyelid in the face model 542. That is being said, the eyeball model 532 can be oriented to match an expected eye contact without adjusting the face model 542.

In particular embodiments, the avatar-rendering system 500 may be implemented in any suitable computing device, such as, for example, a personal computer, a laptop computer, a cellular telephone, a smartphone, a tablet computer, an augmented/virtual reality device, a head-mounted device, a portable smart device, a wearable smart device, or any suitable device which is compatible with the avatar-rendering system 500. In the present disclosure, a user which utilizes the central module 510 may be referred to a device mounted on a movable object, such as a vehicle, or a device attached to a person. In the present disclosure, a user may be an individual (human user), an entity (e.g., an enterprise, business, or third-party application), or a group (e.g., of individuals or entities) that interacts or communicates with the avatar-rendering system 500. In particular embodiments, the central module 510 may be implemented in a head-mounted device. The head-mounted device comprises one or more processors configured to implement the camera 520, the eye computing unit 530, the face computing unit 540, and the avatar rendering unit 550 of the central module 510. In one embodiment, each of the processors is configured to implement the camera 520, the eye computing unit 530, the face computing unit 540, and the avatar rendering unit 550 separately.

This disclosure contemplates any suitable network to connect each element in the avatar-rendering system 500 or to connect the avatar-rendering system 500 with other systems. As an example and not by way of limitation, one or more portions of network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network may include one or more networks.

Figure 6:
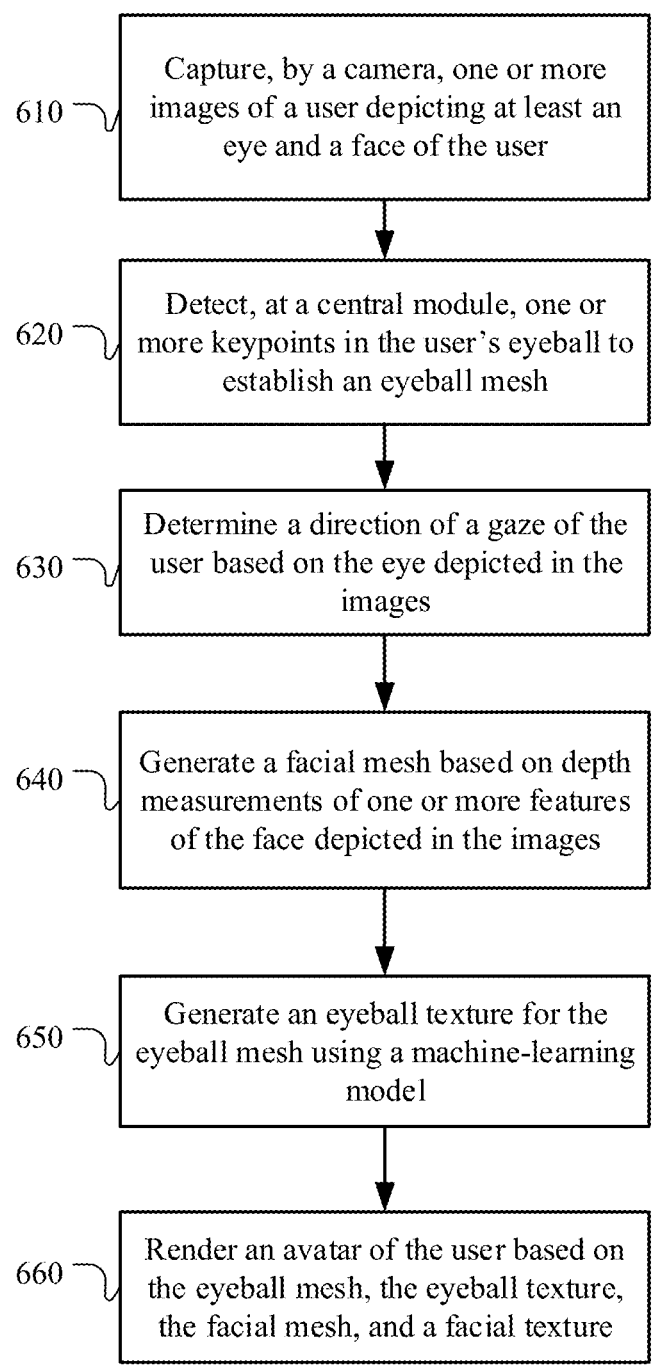
FIG. 6 illustrates an example embodiment of a method for rendering an avatar using an eye model and a face model.

FIG. 6 illustrates an example method 600 for rendering an avatar using an individual eyeball model, in accordance with certain embodiments. A central module may be implemented in the wearable device (e.g., a head-mounted display.). The central module may also be provided to or displayed on any computing system (e.g., an end user's device, such as a smartphone, virtual reality system, gaming system, etc.). The method 600 may begin at step 610 capturing, by a camera, one or more images of a user depicting at least an eye and a face of the user. In particular embodiments, the one or more images of the user may comprise different perspectives of eyeballs of the user to generate a 3D mesh of eyeballs of the avatar. In particular embodiments, the one or more images of the user may comprise different gaze directions to determine the direction of the gaze.

At step 620, the method 600 may detect, at a central module, one or more keypoints in the user's eyeball to establish an eyeball mesh. In particular embodiments, the method 600 may further train a third machine-learning model to determine the one or more keypoints in eyeballs of the user regionally extracted from the one or more images of the user, and generate the eyeball mesh based on the one or more keypoints.

At step 630, the method 600 may determine a direction of a gaze of the user based on the eye depicted in the images. In particular embodiments, the direction of a gaze of the user may be determined based on the eyeball mesh, e.g., a contour of the eyeball.

At step 640, the method 600 may generate a facial mesh based on depth measurements of one or more features of the face depicted in the images.

At step 650, the method 600 may generate an eyeball texture for the eyeball mesh using a machine-learning model. In particular embodiments, the eyeball texture may comprise a base texture and a surfacial texture. The base texture may comprise an area where does not change as the eye moves, and the surfacial texture comprises refraction and reflection in the eye. In particular embodiment, the avatar may be compared to the one or more images of the user to update the machine-learning model. In particular embodiments, the updated machine-learning model may be configured to generate images for television monitors, cinema screens, computer monitors, mobile phones, or tablets.

At step 660, the method 600 may render an avatar of the user based on the eyeball mesh, the eyeball texture, the facial mesh, and a facial texture. In particular embodiments, the method 600 may further generate the facial texture based on the one or more images of the user using a second machine-learning model, and render the avatar based on eyeballs of the avatar and face of the avatar. The eyeballs of the avatar are rendered based on the eyeball mesh and the eyeball texture, and the face of the avatar is rendered based on the facial mesh and the facial texture. In particular embodiments, the eyeballs of the avatar may be adjusted independently from the face of the avatar to match the one or more images of the user. In particular embodiments, the avatar may be compared to the one or more images of the user to update the second machine-learning model. In particular embodiments, the updated second machine-learning model may be configured to generate images for television monitors, cinema screens, computer monitors, mobile phones, or tablets.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for local localization including the particular steps of the method of FIG. 6, this disclosure contemplates any suitable method for local localization including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
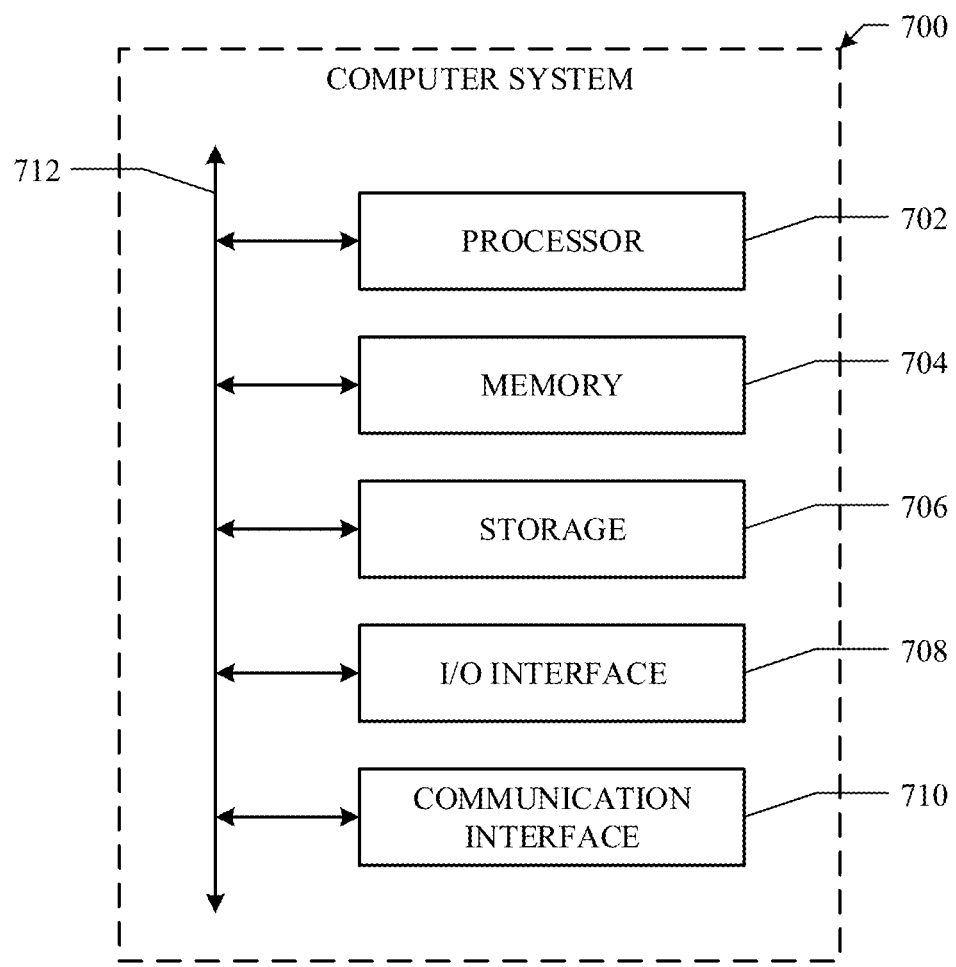
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

According to various embodiments, an advantage of features herein is that an individual eye model for an avatar can render an accurate, precise, real eye contact for a display. The rendered eyeball comprises an 3D eyeball mesh and an eyeball texture. The eyeball mesh can be customized and built based on detected keypoints/features in the user's eyeball to determine a true gaze of the eyeball, and the eyeball texture comprises two layers of texture which can reproduce the real refraction and reflection in the user's eyes. Furthermore, particular embodiments of the present disclosure also enable to perform eye tracking based on the determination of eyeball mesh, such as the motion of the cornea. In addition, with an individual eye model, the eye contact can be easily adjusted independently from the rest of the face. The trained eye model can optimize the orientation of the eyeball until the eye contact matches the captured image of the user. Therefore, particular embodiments disclosed in the present disclosure may provide an improved, efficient, flexible method for rendering avatars. With a precise eyeball control, high-fidelity eyeball textures, and all of the dynamic facial appearance, an avatar with a real eye contact is provided.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising, by a computing system:
capturing one or more images of a user using one or more cameras, the one or more images depicting at least an eye and a face of the user;
determining a direction of a gaze of the user based on the eye depicted in the one or more images;
generating a facial mesh of the face depicted in the one or more images;

generating an eyeball texture for an eyeball mesh by processing the direction of the gaze and at least a portion of the facial mesh using a first machine-learning model; and rendering an avatar of the user based on at least the eyeball mesh, the eyeball texture, the facial mesh, and a facial texture.

2. The method of claim 1, further comprising:

generating the facial texture associated with the facial mesh of the user using a second machine-learning model;

wherein an eyeball of the avatar is rendered based on the eyeball mesh and the eyeball texture, and a face of the avatar is rendered based on the facial mesh and the facial texture.

3. The method of claim 2, wherein the eyeball of the avatar is adjusted independently from the face of the avatar to match the eye of the user depicted in the one or more images of the user.

4. The method of claim 2, wherein the avatar is compared to the one or more images of the user to update the first machine-learning model and the second machine-learning model.

5. The method of claim 1, further comprising:

detecting one or more keypoints in the eye depicted in the one or more images of the user;

wherein the direction of the gaze is determined based on the one or more keypoints.

6. The method of claim 1, further comprising:

generating the eyeball mesh by processing the direction of the gaze, at least the portion of the facial mesh, and a viewpoint using the first machine-learning model.

7. The method of claim 1, wherein generating the eyeball texture further comprises processing a viewpoint using the first machine-learning model.

8. The method of claim 1, wherein the eyeball texture is generated based on (1) a base texture that is independent of eye movement and (2) a surfacial texture that comprises refraction and reflection data.

9. The method of claim 1, wherein the one or more images are captured while the user is wearing a head-mounted device.

10. One or more computer-readable non-transitory storage media embodying software that is operable when executed to:

capture one or more images of a user using one or more cameras, the one or more images depicting at least an eye and a face of the user;

determine a direction of a gaze of the user based on the eye depicted in the one or more images;

generate a facial mesh features of the face depicted in the one or more images;

generate an eyeball texture for an eyeball mesh by processing the direction of the gaze and at least a portion of the facial mesh using a first machine-learning model; and render an avatar of the user based on at least the eyeball mesh, the eyeball texture, the facial mesh, and a facial texture.

11. The media of claim 10, wherein the software is further operable when executed to:

generate the facial texture associated with the facial mesh of the user using a second machine-learning model;

wherein an eyeball of the avatar is rendered based on the eyeball mesh and the eyeball texture, and a face of the avatar is rendered based on the facial mesh and the facial texture.

12. The media of claim 11, wherein the eyeball of the avatar is adjusted independently from the face of the avatar to match the eye of the user depicted in the one or more images of the user.

13. The media of claim 11, wherein the avatar is compared to the one or more images of the user to update the first machine-learning model and the second machine-learning model.

14. The media of claim 10, wherein the software is further operable when executed to:

detect one or more keypoints in the eye depicted in the one or more images of the user;

wherein the direction of the gaze is determined based on the one or more keypoints.

15. The media of claim 10, wherein the software is further operable when executed to generate the eyeball mesh by processing the direction of the gaze, at least the portion of the facial mesh, and a viewpoint using the first machine-learning model.

16. The media of claim 10, wherein the software is further operable when executed to generate the eyeball texture by further processing a viewpoint using the first machine-learning model.

17. The media of claim 10, wherein the eyeball texture is generated based on (1) a base texture that is independent of eye movement and (2) a a surfacial texture that comprises refraction and reflection data.

18. A system comprising: one or more processors; and one or more computer-readable non-transitory storage media coupled to one or more of the processors and comprising instructions operable when executed by one or more of the processors to cause the system to:

capture one or more images of a user using one or more cameras, the one or more images depicting at least an eye and a face of the user;

determine a direction of a gaze of the user based on the eye depicted in the one or more images;

generate a facial mesh of the face depicted in the one or more images;

generate an eyeball texture for an eyeball mesh by processing the direction of the gaze and at least a portion of the facial mesh using a first machine-learning model; and render an avatar of the user based on at least the eyeball mesh, the eyeball texture, the facial mesh, and a facial texture.

19. The system of claim 18, wherein the instructions further cause the system to:

generate the facial texture associated with the facial mesh of the user using a second machine-learning model;

wherein an eyeball of the avatar is rendered based on the eyeball mesh and the eyeball texture, and a face of the avatar is rendered based on the facial mesh and the facial texture.

20. The system of claim 19, wherein the eyeball of the avatar is adjusted independently from the face of the avatar to match eye of the user depicted in the one or more images of the user.

* * * * *